United States Patent Office 3,415,063
Patented Dec. 10, 1968

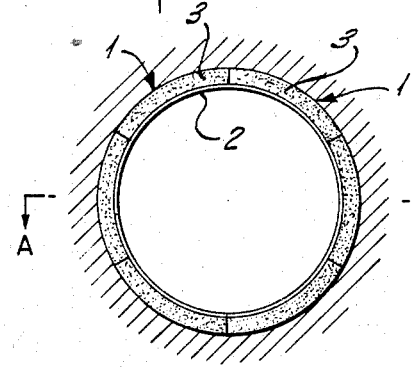
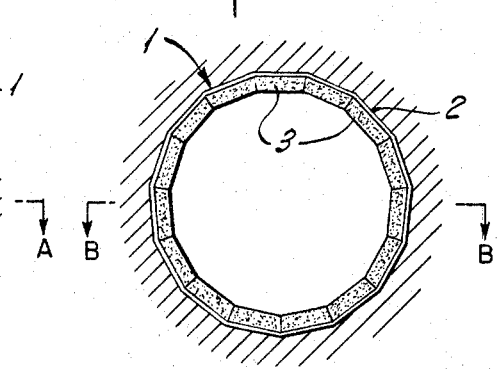
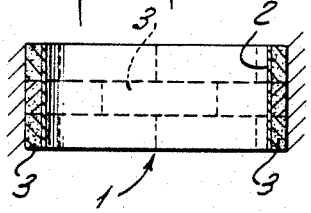
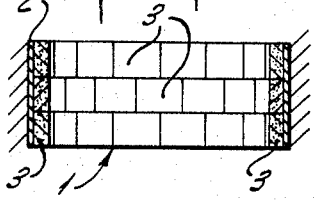
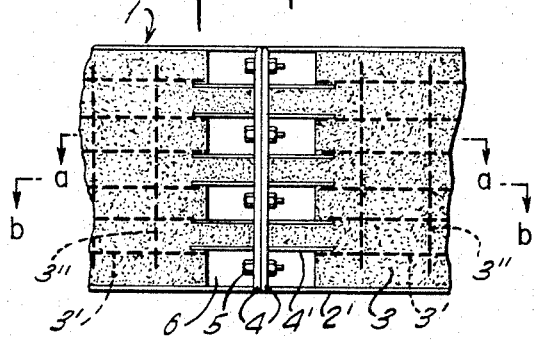
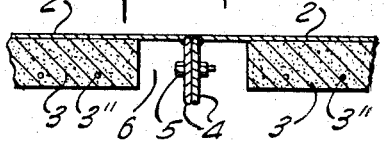
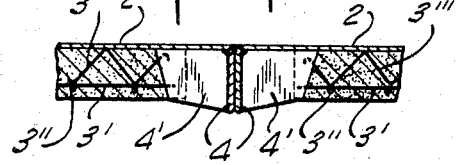
INVENTORS
YOSHIO AKITA
TOKIO FUJII
MASAO SASAGAWA
ATTORNEYS

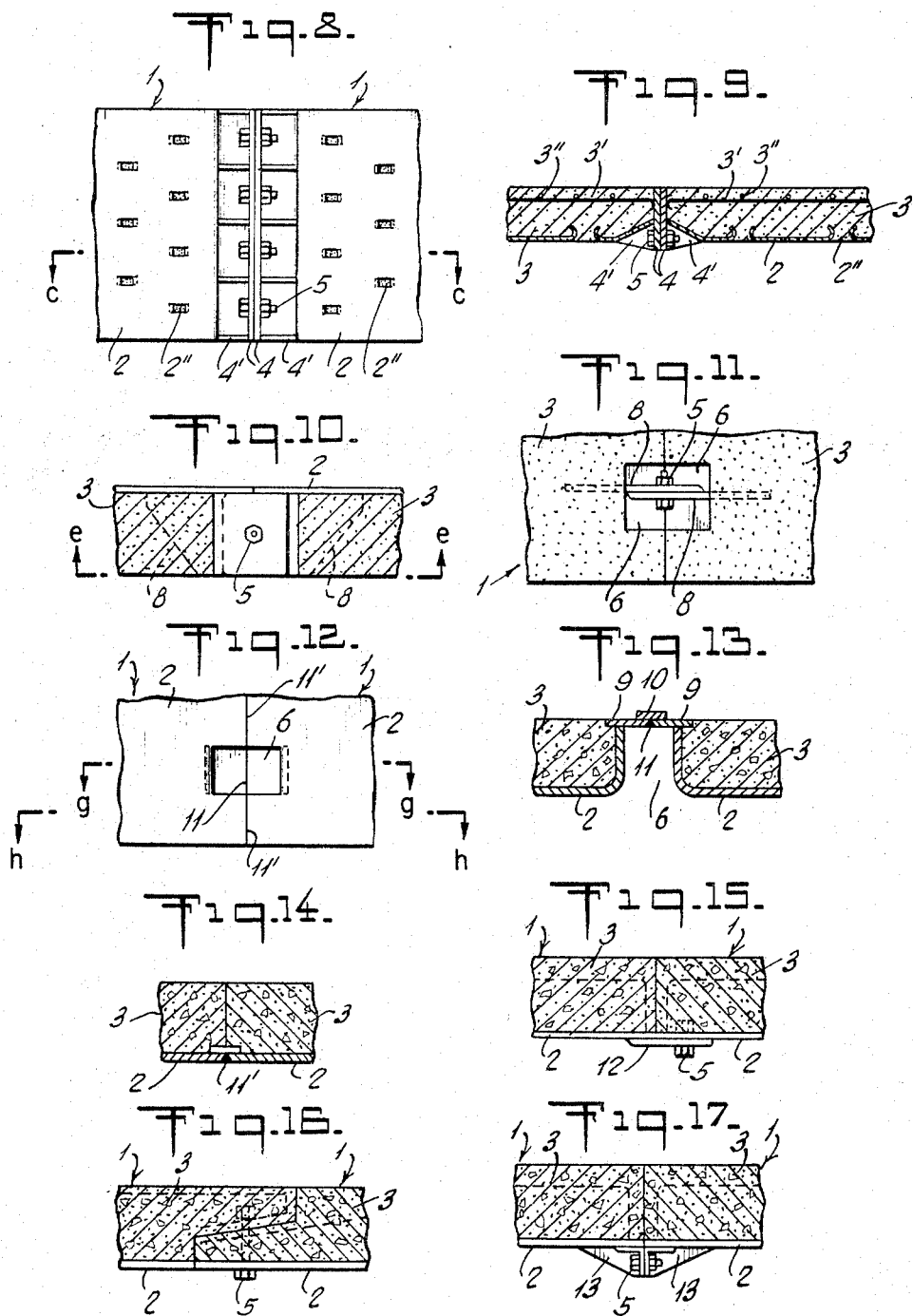

3,415,063
SHIELD SEGMENT FOR COVERING THE INNER WALL OF THE TUNNEL MADE OF COMPOSITE SHELL UNITS
Yoshio Akita, Tokio Fujii, and Masao Sasagawa, Tokyo-to, Japan, assignors to Ishikawajima-Harima Jukogyo Kabushiki Kaisha, Chiyoda-ku, Tokyo, Japan, a company of Japan
Filed Aug. 6, 1965, Ser. No. 477,773
Claims priority, application Japan, Aug. 12, 1964, 39/46,367
8 Claims. (Cl. 61—45)

ABSTRACT OF THE DISCLOSURE

A tunnel lining element to be assembled with a plurality of other tunnel lining elements of the same construction so as to form therewith the lining for a tunnel. The tunnel lining element is prefabricated and is composed of a concrete block having opposed inner and outer faces. The inner face of the block is adapted to be directed toward the interior of the tunnel while the outer face thereof is adapted to be directed away from the interior of the tunnel. Located against one of these faces of the block is a steel plate, and embedded within the block is a reinforcing structure of wavy or corrugated configuration having crests welded to the steel plate so that in this way this latter reinforcing structure forms a shear connector preventing shearing movements between the steel plate and the concrete block. Additional reinforcing elements are embedded within the concrete block, and a connecting means is fixed with the steel plate at the ends of the element for connecting each element to the adjoining elements so as to form therewith the tunnel lining structure.

---

This invention relates to composite shell units of the shield segments to be used for covering the inner wall of a tunnel composed of steel plates and ferro-concrete, or of steel plates and concrete, interconnected by means of shear connectors.

Conventional shield segments to be used for covering the inner wall of tunnels have been made of ferro-concrete, steel plate, cast iron, etc. Each of these materials have a defect of its own; shield segments of ferro-concrete are heavy and hard to handle while increasing the volume of construction work because of its considerable thickness; shield segments of steel plates have units of complicated shapes with a resultant high cost, and moreover require extra work for covering intended for prevention of corrosion; and cast iron units are generally too expensive.

Composite shell units of this invention aim at the removal of the above-mentioned defects inherent in the conventional segments. The steel plate which is processed through pressing, punching or the like, is combined with ferro-concrete (occasionally simple concrete) so as to constitute a shape of rectangle or trapezoid with any degree of curvature, and when the prefabricated units thus made are combined into a structure, the parts to be joined are provided with bolts, welding, nails, or some other means of bonding.

In accordance with the invention the segments for covering the inner wall of the tunnel are made up of a plurality of tunnel lining elements each of which has the structure of the invention. This latter structure includes a concrete block having an inner face which is to be directed toward the interior of the tunnel and an outer face which is to be directed away from the interior of the tunnel. A steel plate is located in engagement with and covers one of these faces of the concrete block. Embedded within the concrete block is a corrugated or wavy-shaped shear connector having crests welded to the steel plate, this latter connector otherwise being completely embedded within the concrete block, so that in this way the latter and the steel plate are connected to each other in a manner preventing shearing movements therebetween. Additional reinforcing elements are also embedded in the concrete block, and the steel plate carries at the ends of the tunnel lining element a fastening means for fastening each element to the adjoining elements.

In the following passages, the explanation shall be made in reference to the drawings.

FIGURE 1 presents a cross section of an embodiment of the shield segment structure. FIGURE 2 presents a sectional view on the line A—A of FIGURE 1. FIGURE 3 presents a cross section of another embodiment. FIGURE 4 presents a sectional view on the line B—B of FIGURE 3. FIGURES 5 to 17 present various embodiments of joints which splice composite shell units. The examples of shield segments as shown in FIGURES 1 and 2 are the cylindrical structure made through the bonding of 6 pieces of shell units 1 having the shape of a circular arc. In this structure steel plate 2 is placed inside shell unit 1, and ferro-concrete 3 is synthesized outside.

The embodiments shown in FIGURES 3 and 4 present a multi-angular structure composed of 15 pieces of rectangular flat-shaped shell units 1 bonded together. In these embodiments, steel plate 2 is placed outside each shell unit 1, and concrete 3 is synthesized inside.

The shell unit in each of the two above-mentioned embodiments has steel plate on one side, but in some instances, steel plate is attached to both sides of the concrete.

And in constructing these shield segments, each shell unit 1 is bonded by means of bolts, welding, nails, or the like, with various joints attached to the steel plate. Embodiments thereof will be explained with reference to FIGURES 5 to 17.

FIGURE 5 is an example of the joint of a shell unit whose outer surface is composed of a steel plate, while FIGURE 6 is a sectional view in the direction of the line a—a, and FIGURE 7 is a sectional view in the direction of the line b—b. In this embodiment, ferro-concrete 3 made of steel plate 2 of shell unit and iron reinforcing bar 3' and 3" (3' represents the main bar and 3" represents the distributing bar) is synthesized into a unified structure through the medium of corrugated iron bar shear connector 3'''. The shear connector 3''' which is of wavy or corrugated configuration has crests at one side thereof welded directly to the steel plate 2, as is clearly apparent from FIG. 7, while the opposed crests of the shear connectors 3''' which are embedded in the concrete block are welded to the longitudinally extending reinforcing bars 3'. The transversely extending reinforcing bars 3" interconnect all of the reinforcing structure forming therefrom a network of reinforcing bar structure which is fixed by the welding of the crests of the shear connectors 3''' to the steel plate 2, so that in this way an exceedingly strong structure which will reliably prevent any shearing of the thin steel plate 2 with respect to the concrete is provided. Flange 4 is welded to the ends of steel plate 2 so that this flange 4 is reinforced by means of bracket 4' to which iron bar 3' is welded, so as to enable bolt 5 to bind together flanges 4, wherein 6 represents the release aperture to be used for binding process.

FIGURE 8 is an example of the joint of a shell unit whose inner surface is composed of steel plate. FIGURE 9 shows a sectional view in the direction of the line c—c of FIGURE 8. In this embodiment, part of steel plate 2 which is subjected to press-processing of semi-punching designed to show shear connector effect is combined with iron reinforcing bars 3' and 3", and concrete 3 is poured into this combination of materials to constitute the composite material. At its ends steel plate 2 is folded outwards, and flanges 4 are welded thereto so as to enable bolt 5 to bind together flanges 4, which are reinforced by bracket 4'.

FIGURE 10 shows an example of welding of joint plate 8 at a right angle to the outer steel plate 2. As is shown by the plane figure in the direction of e—e (FIGURE 11), the above-mentioned joint plates 8 placed upon each other are bound together by means of bolt 5 within release aperture 6.

FIGURE 12 shows an example of the joint for welding. FIGURE 13 is a sectional view thereof in the direction of the line g—g, while FIGURE 14 is a sectional view thereof in the direction of the line h—h. In these figures, a part of the inner steel plate 2 is carved and folded outwards, and to the outer surface of the welded plate held at the ends thereof is attached a backing plate 9, 10 (it is welded beforehand to either one of the shell units.) Thus at the time of bonding, the welding line 11 is welded from within release aperture 6 (refer to FIGURE 13), and the bonding area other than said release aperture is welded at the line of welding 11'.

FIGURES 15 and 16 show the cases where bolts are inserted at the right angle to the shell unit. In FIGURE 15, bolt 5 is buried into shell unit 1 on one side, and the bolt 5 is inserted into the hole of binding plate 12 welded to the shell unit on the other side with resultant effect of binding together the shell units. In FIGURE 16, shell units 1 are piled upon each other, and the bolt 5 buried into the shell unit situated on the back side is made to penetrate the other shell unit to its front surface, where it is bound with a nut.

In both of the two latter examples, it goes without saying that a cap nut can be buried in lieu of the bolt. FIGURE 17 shows the case where flanges 13 are welded to the outer surface of shell unit 1 for bonding and these two flanges are bound together by bolt 5.

As shown above in several embodiments, the composite shell unit of this invention is lower in price than the conventional one composed of steel plate or cast iron, since the shell unit of this invention is composed of steel plate and ferro-concrete. Moreover, the high strength of this shell unit makes it possible to keep the material thinner than the conventional one, thus lessening the volume of work required for digging and carving. Its advantages are also found in the fact that the prefabricated unit can be mass-produced and that it is easy to handle because of its light weight.

What we claim is:

1. A prefabricated tunnel lining element comprising a concrete block having an inner face adapted to be directed toward the interior of the tunnel and an outer face adapted to be directed away from the interior of the tunnel, a steel plate engaging and covering one of said faces of said concrete block, an elongated wavy reinforcing element embedded within said block and having crests welded to said steel plate to form a shear connector preventing shearing movements of said steel plate and concrete block with respect to each other, additional reinforcing bars embedded within said concrete block, and said steel plate having a pair of opposed ends, and fixing means located at said ends of said steel plate for fixing the latter to the steel plates of adjoining lining elements.

2. The combination of claim 1 and wherein said block has opposed ends formed with hollow portions where portions of said steel plate are exposed, said fixing means including flanges fixed to said steel plate and located at said hollow portions of said blocks so as to be accessible, and steel bracket plates welded to said flanges and also welded to some of said reinforcing bars which are embedded in the concrete block.

3. The combination of claim 1 and wherein said steel plate is formed with projections extending into and embedded within the concrete block, said projections forming integral extensions of said steel plate and also functioning as shear connectors preventing shearing movements between the concrete block and the steel plate.

4. The combination of claim 1 and wherein a plurality of said plates are situated at said one face of said concrete block covering the latter and said plates being arranged in side-by-side relation engaging each other and a plurality of said wavy shear connectors extending along each of said plates and being welded thereto, said fixing means being located at the ends of each of said plates.

5. The combination of claim 4 and wherein some of said additional reinforcing bars are welded to inner crests of said wavy reinforcing elements which are embedded within the concrete block and are distant from the steel plates while additional reinforcing bars extend transversely of and are welded to the bars which are welded to the inner crests of the wavy shear connectors.

6. The combination of claim 1 and wherein said fixing means at the ends of said plate include portions of said plate which are to be located next to adjoining portions of the other lining elements and which are to be bolted thereto.

7. The combination of claim 1 and wherein said fixing means at the ends of said plate include end portions of said plate which are to be located next to end portions of adjoining plates of additional lining elements to be welded thereto.

8. The combination of claim 1 and wherein said fixing means at the ends of said plate include portions of the element which are to overlap portions of adjoining elements to be fixed thereto in overlapping relationship.

References Cited

UNITED STATES PATENTS

| 1,624,369 | 4/1927 | Serra | 61—45 X |
| 1,837,134 | 12/1931 | Porter et al. | 61—45 |
| 1,853,224 | 4/1932 | Proctor | 61—45 |
| 1,979,896 | 11/1934 | McAlpine | 61—45 |
| 2,077,137 | 4/1937 | Wilkoff | 61—45 |
| 2,172,030 | 9/1939 | Moran | 61—45 |
| 2,230,032 | 11/1941 | Freyssinet | 61—45 |
| 2,234,782 | 3/1941 | Smith | 61—45 |

FOREIGN PATENTS

| 11,176 | 2/1908 | Great Britain. |
| 127,735 | 6/1919 | Great Britain. |
| 272,397 | 6/1927 | Great Britain. |

DAVID J. WILLIAMOWSKY, *Primary Examiner.*

DENNIS L. TAYLOR, *Assistant Examiner.*

U.S. Cl. X.R.

61—85